United States Patent [19]

Kashioka et al.

[11] 3,898,617

[45] Aug. 5, 1975

[54] SYSTEM FOR DETECTING POSITION OF PATTERN

[75] Inventors: Seiji Kashioka, Kokubunji; Masakazu Ejiri, Tokorozawa, both of Japan

[73] Assignee: Hitachi, Ltd., Japan

[22] Filed: Feb. 22, 1974

[21] Appl. No.: 444,858

[30] Foreign Application Priority Data

Feb. 22, 1973 Japan ............................ 48-21636

[52] U.S. Cl. ..................... 340/146.3 H; 340/146.3 AH; 340/146.3 MA

[51] Int. Cl. ............................................ G06k 9/04

[58] Field of Search .......... 340/146.3 H, 146.3 AH, 340/146.3 Q, 146.3 E, 146.3 AC

[56] References Cited

UNITED STATES PATENTS

| | | | |
|---|---|---|---|
| 3,120,578 | 2/1964 | Potter et al. | 340/146.3 H |
| 3,292,149 | 12/1966 | Bourne | 340/146.3 E |
| 3,576,534 | 4/1971 | Steinberger | 340/146.3 Q |
| 3,636,513 | 1/1972 | Tisdale | 340/146.3 AC |
| 3,643,215 | 2/1972 | Ingham et al. | 340/146.3 AH |
| 3,748,644 | 7/1973 | Tisdale | 340/146.3 H |

*Primary Examiner*—Leo H. Boudreau
*Attorney, Agent, or Firm*—Craig & Antonelli

[57] ABSTRACT

A system for detecting the position of a pattern, wherein a specific partial pattern in a pattern of an object is previously stored as a standard pattern, two-dimensional partial patterns are sequentially set out from the pattern of the object picked up by an image pickup device, the partial patterns set out are successively compared with the standard pattern to thus detect degrees of coincidence, and coordinates of a position to be found on the pattern of the object are calculated from the coordinates of a position representing the most coincident partial pattern.

15 Claims, 25 Drawing Figures

SYSTEM FOR DETECTING POSITION OF PATTERN

BACKGROUND OF THE INVENTION

The present invention relates to a system for detecting the position of a pattern and, more particularly, to a position detecting system which detects the position of a two-dimensional pattern within a two-dimensional plane automatically without any contact therewith.

DESCRIPTION OF THE PRIOR ART

In order to detect a two-dimensional position of an object without any contact therewith, there has hitherto been adopted, for example, a method which differentially provides outputs from the photosensitive planes of solar cells or the like which are arranged in pairs in each of X- and Y-directions, where the object has a simple form such as a rectangle. This method, however, involves a problem in precision. Also, it is essentially a method called the "zero-balance method" and it requires the positioning of an object at the center by means of a servomechanism, so that the differential output from the photosensitive planes may become zero, and the detection of the position by, for example, a code plate from the movement of the servomechanism, at that time.

Accordingly, the time required for the detection is long. On account of the zero-balance method, even when an erroneous object is received by the detector, it responds thereto and detects a plausible position. That is, the prior-art method cannot so much as recognize whether an object is present or absent.

SUMMARY OF THE INVENTION

An object of the present invention is to provide a system which, in order to render the assembly process or inspection process of transistors, ICs, LSIs etc. automated, can precisely and highly speedily detect the positions of all objects, even those having complicated patterns.

In order to accomplish the above-mentioned object, the position detecting system of the present invention is constructed such that one or more local patterns of an object are stored as standard patterns, that the local patterns and two-dimensional patterns of the object received by an image pickup device, such as a Vidicon, are continuously compared, and that a coordinate position being best coincident is detected.

The other objects and features of the invention will be apparent from the following detailed description when read in conjunction with the accompanying drawings.

GENERAL PART OF THE INVENTION

Figure 1:
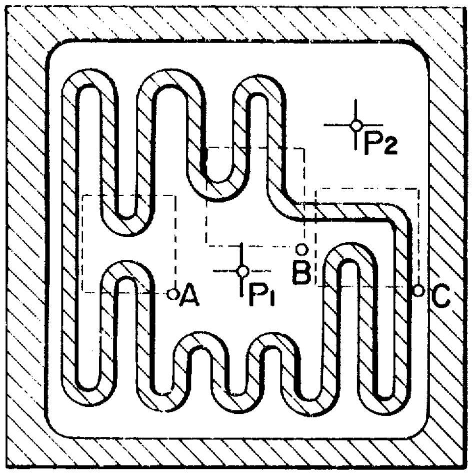
FIG. 1 is a diagram showing the pellet of a transistor forming an example of an object to which the present invention is applied.

FIG. 1 is a diagram of the pellet of a transistor forming an example of an object to which the present invention is applied. In the figure, the cross-hatched parts are silicon oxide surfaces, while parts with no oblique line are electrode portions obtained by aluminum vapor deposition.

When such transistors are successively supplied to an assembling machine, it is necessary to automatically detect those positions $P_1$ and $P_2$ in the electrode portions at which gold wires are to be bonded, to supply to the machine the coordinate values of the positions and to accurately locate a thermocompression bonding machine for the gold wires by means of, for example, a servomechanism.

For detecting the specific positions $P_1$ and $P_2$ of the transistor, there are first selected local patterns which have no similar pattern among the whole complicated pattern. In this example, three local patterns enclosed by dotted lines can be selected.

The representative positions of the three local patterns are, for example, the central positions thereof. Here, the representative positions shall be set at positions A, B and C at the respective right lower corners for the sake of explanatory convenience.

Figure 2:
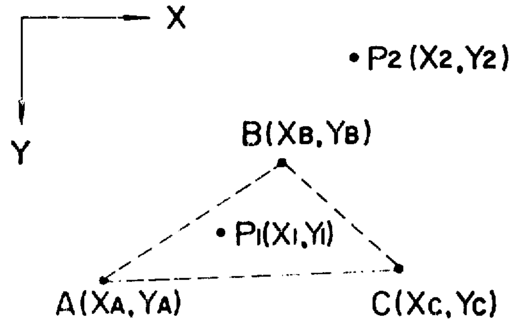
FIG. 2 is a diagram showing the positional relations among points A, B, C, $P_1$ and $P_2$ in FIG. 1.

The relations of the coordinates at this time are extracted and depicted in FIG. 2. It is assumed that the transistor comes into the field of view of a detector so accurately as to exhibit only shifts in the X- and Y-directions and to exhibit no rotation in the XY-plane (namely, no inclination). Then, when the coordinates of the position of one local pattern, for example, the coordinates $(X_A, Y_A)$ of the point A are found, the coordinates $(X_1, Y_1)$ of the point $P_1$ for bonding and the coordinates $(X_2, Y_2)$ of the point $P_2$ can be calculated by adding certain predetermined values to them or subtracting them from the coordinate values found.

It is not assured, however, that the coordinates $(X_A, Y_A)$ detected in this case are really those of the point A. For example, a place different from the original partial pattern may be better coincident on account of dirt or a chip in the transistor surface.

In order to avoid this drawback, the positions of two local patterns, for example, the points A and B may be detected. When the coordinates of the points A and B are found, it is made sure that the distance and direction between the points A and B:

$$\sqrt{(X_A - X_B)^2 + (Y_A - Y_B)^2}$$

and $$\tan^{-1} \frac{Y_A - Y_B}{X_A - X_B}$$

lie within certain predetermined ranges. If so, it is judged that the coordinates of the points A and B are those of both the local patterns A and B. Then, the coordinates of the points $P_1$ and $P_2$ can be found with reference to, for example, the coordinates of the center of a line connecting the points A and B (there is the possibility that the errors of the detections of the points A and B will thus be averaged).

In this case, the direction of the line between the points A and B is known. Therefore, even when the transistor has a slight inclination, the coordinates of the points $P_1$ and $P_2$ can be found as values with the inclination corrected, and more precise position detections are allowed.

If at least one of the distance and angle between the points A and B exceeds a predetermined range, either or both of the points A and B are erroneously detected, and the coordinates of a false point or points are indicated. In this case, the coordinates ($X_C$, $Y_C$) of another local pattern are detected, and the foregoing examination is conducted between the points A and C. If the result is good, the coordinates of the points $P_1$ and $P_2$ are detectible. If it is bad, the foregoing examination may be further carried out between the points B and C.

Thus, in general, as the number of the local patterns previously stored becomes large, the combinations of the examination increase to that extent, and reliability can be enhanced accordingly. Moreover, the angular position of the supplied transistor pellet is known from the angle between the two detected positions, and the coordinates of the points $P_1$ and $P_2$ can be computed as values with the supply error corrected.

The examinations may be sequentially performed. Alternatively, they can also be concurrently performed in such a way that computing circuits are provided in parallel for some combinations considered. Even when the transistor is supplied aslant within the XY-plane to some extent, the position can be satisfactorily detected on the basis of the degree of coincidence with the stored standard pattern at the normal position. Although the degree of coincidence at that time is of course, somewhat inferior, the normal position can be detected since a smaller difference is exhibited than from the pattern of any other part.

Figure 3A:
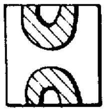
FIGS. 3*a*-3*i* are diagrams showing partial patterns in FIG. 1.
Figure 3B:
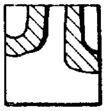
Figure 3C:
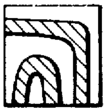
Figure 3D:
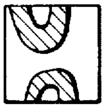
Figure 3E:
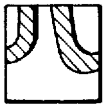
Figure 3F:
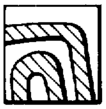
Figure 3G:
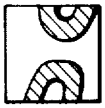
Figure 3H:
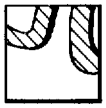
Figure 3I:
Figures 5A, 5B, 5C, 5D, 5E, 5F, 5G:
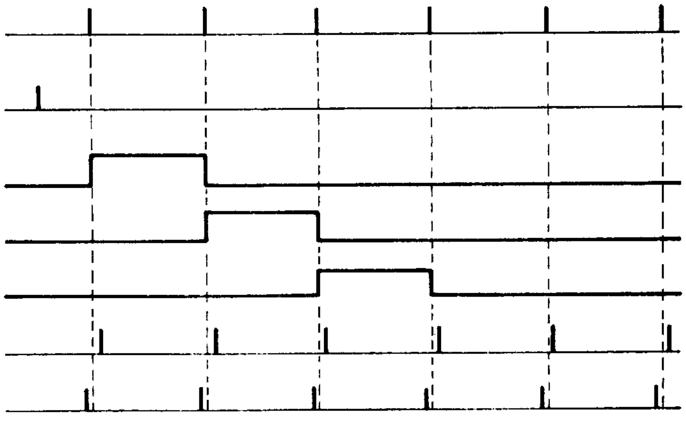
FIGS. 5*a*-5*g* are explanatory diagrams of timing signals for controlling the apparatus in FIG. 4.

However, when the inclination of the transistor becomes still larger, for example, becomes approximately 20°, the degree of coincidence is already inferior to the standard pattern at the normal position, and there is the possibility that another part will become more similar. For this reason, in addition to the local patterns at the normal positions as shown in FIGS. 3*a*, 3*b* and 3*c*, the patterns shown in FIGS. 3*d*, 3*e* and 3*f* are prepared with the respective normal patterns inclined leftwards by approximately 10° and patterns shown in FIGS. 3*g*, 3*h* and 3*i* are prepared with the respective normal patterns inclined rightwards by the same angle. Thus, the positions can be detected by nine standard patterns in this example. In this case, in the examination between the inclined patterns, for example those in FIGS. 3*d* and 3*e*, a separate predetermined range in which an angle $$\tan^{-1} \frac{Y_D - Y_E}{X_D - X_E}$$

is different from the case of $$\tan^{-1} \frac{Y_A - Y_B}{X_A - X_B}$$

by the angle corresponding to the inclination of the patterns, or by approximately 10° in this example, may be set, and whether or not the direction lies within this range may be determined.

It has also been experimentally verified that in the case of a transistor, the positions can be satisfactorily detected for supply angle errors of approximately ±20° by preparing such inclined local patterns as standard patterns. If the transistor can enter upside down, the disposal can, of course, be made by preparing upside-down standard patterns.

In the above, description has been made of the features of the case of detecting the coordinates of the final positions $P_1$ and $P_2$ with a single local pattern or a plurality of local patterns, and also of the system of the computation. With respect to the computation itself, if the position is only detected in the form of analog signals or digital signals of a plurality of bits, it is very easy to assemble a computing circuit for the special use to which the signals are supplied.

Recently, the application of a minicomputer has become remarkable also in transistor producing processes of this sort. When the minicomputer is used to this end, the computation can be realized at high speed without difficulty by means of a general-purpose computing device.

Examinations of the distance and angle have been described as relying on the strict equations. Of course, however, if the supply angle errors of the transistors are as small as within ±20° or so, a variety of equations of approximate calculations can be utilized, and the root calculation, square calculation and inverse tangent calculation can be omitted. In addition, the computing method can be subject to various modifications. Moreover, if the examinations result in the rejection in all the combinations prepared, it is usually the case that no object exists or that, although an object exists, it is a very dirty non-conforming article. In this case, a "reject" signal can be provided.

PREFERRED EMBODIMENTS OF THE INVENTION

Figure 4:
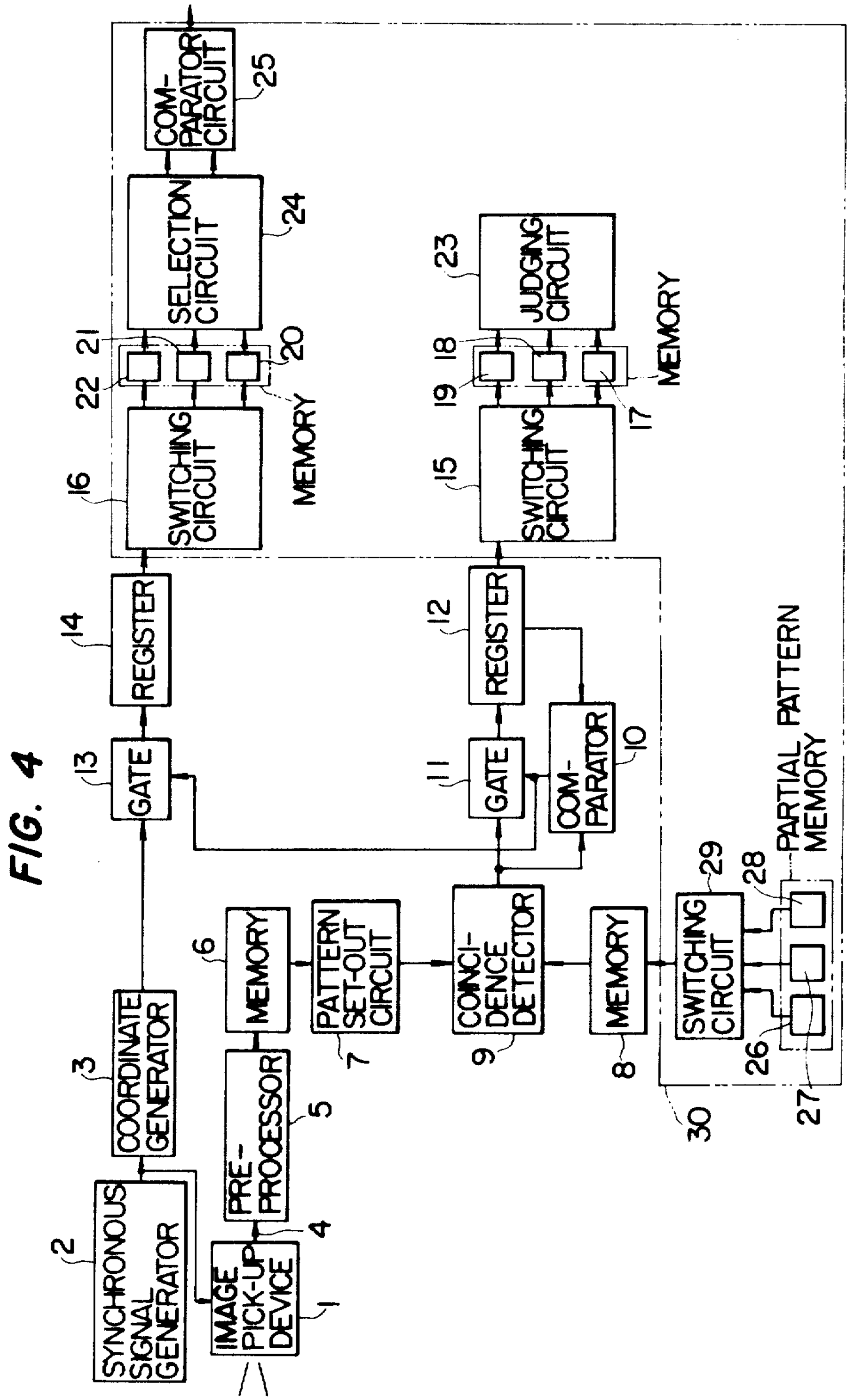
FIG. 4 is a schematic block diagram showing an embodiment of the position detecting system according to the present invention.

In FIG. 4, an image pickup device 1 constituted of, for example, a Vidicon is assumed to be subjected to raster scanning as in conventional image pickup devices and in response to outputs from a synchronous signal generator 2 for driving it. Regarding the position of a scanning beam, it is assumed that the X- and Y-coordinates are continually obtained by means of a coordinate generator 3.

An image signal 4 from the image pickup device 1 is fed via a pre-processor 5 composed of, for example, a threshold circuit to transform the image signal into a binary signal, which is supplied to a temporary memory circuit 6 composed of, for example, a shift register. The temporary memory circuit 6 is a so-called dynamic memory as will be described below, and is so constructed that two-dimensional information is read out therefrom in parallel by means of a two-dimensional pattern set-out. circuit 7 at the succeeding stage In the two-dimensional pattern set-out circuit 7, the video signal at the present scanning position of the image pickup device 1 and the information at positions scanned in the past are derived at the same time. That is, just as in a case where a square window frame having certain dimensions in the longitudinal and transverse directions is sequentially moved within the field of view of the image pickup device, the information within the window frame is continually obtained in parallel. The information within the window frame is successively renewed during the progress of the scanning. An example of a circuit arrangement of the two-dimensional pattern set-out circuit 7 will be described below.

When information representative of two-dimensional local patterns within the field of view of the image pickup device is successively extracted from the two-dimensional pattern set-out circuit 7 with the advance of the scanning, it is applied to a coincidence detector 9 together with contents of a partial pattern memory 8 in which partial patterns serving as standards are previously stored. The information and the contents are compared, and the degree of coincidence between the two are detected in succession.

In an actual example of a preferred design, the field of view of the image pickup device 1 is divided into the shape of a grating having 240 and 320 picture elements in length and in width, respectively; the pattern to be set out by the two-dimensional pattern set-out circuit 7 can be brought into the region of a regular square of 12 × 12 picture elements. In this case, it is a matter of course that the region need not always be selected into a regular square, but that it can be arbitrarily designed into a shape consisting, for example, of 10 × 14 picture elements or 8 × 7 picture elements in accordance with a specific purpose.

In the case of 12 × 12 picture elements, it is convenient that the partial pattern memory 8 is also designed into the size of 12 × 12 picture elements. That is, 12 × 12 = 144 bits of information are stored. The degree of coincidence of the entire partial pattern is detected by the coincidence detector 9 in the form of the sum of the degrees of coincidence between the 144 bits of information from the two-dimensional pattern set-out circuit 7 and the respectively corresponding information stored in the memory 8.

At the stage of detection initiation, namely, at the beginning of a frame, the output of the coincidence detector 9 is compared in a comparator 10 with coincidence information corresponding to a high degree of discoincidence previously set in a coincidence value hold circuit or coincidence value memory register 12.

If the present degree of coincidence is better than the contents previously stored in the coincidence value hold circuit 12, the comparator 10 provides an output which is a logical 1. It opens gate circuit 11, feeds the present degree of coincidence to the coincidence value hold circuit 12, and renews the contents thereof. The output of the comparator 10 is further fed to a gate circuit 13, to supply to a coordinate value register 14 the output of a coordinate generator 3 at that time, namely X - and Y-coordinate values corresponding to the position of the scanning beam, and to renew previously stored coordinate values.

Thus, at the time of the termination of the frame at which the scanning is completed, that coordinate position X, Y in the picture at which the partial pattern being the most coincident with the previously stored partial pattern which has been existent is stored in the coordinate value register 14, and information representative of the degree of coincidence at that time is stored in the coincidence value hold circuit 12.

In this manner, the coordinates of the representative position of the partial pattern which has the maximum correlation to one partial pattern serving as the standard can be obtained in the scanning time of 1 frame.

Accordingly, when the contents of the partial pattern memory 8 are successively renewed every frame, the coordinates are obtainable at the respective frames in such a manner that those of the point A in FIG. 1 are acquired during the first frame, that those of the point B are acquired during the second frame and that those of the point C are acquired during the third frame. To this end, the contents of " read only " memories in a processor 30 or of partial pattern memories 26, 27 and 28 provided in a main storage may be previously transmitted through a switching circuit 29 to the partial pattern memory 8 during each frame. Timing signals at this time are as shown in FIGS. 5*a*-5*g*. Hereinafter, the signals will be referred to as signals (*a*) - (*g*) corresponding to those shown in FIG. 5*a*-5*g* respectively.

More specifically, a signal (*b*) indicating that the transistor being the object has been inserted is received, and using a synchronizing signal (*a*) of the image pickup device which is moving independently of the transistor, there are generated a signal (*c*) which is a 1 only during the first frame, a signal (*d*) which is a 1 only during the second frame, a signal (*e*) which is a 1 only during the third frame, . . . For example, in order to obtain the signal (*c*), a circuit may be constructed in which a flip-flop is triggered by the signal (*b*), the output of the flip-flop and the pulse (*a*) are applied to an AND gate, another flip-flop is triggered by the output of the AND gate, and this flip-flop is reset by the AND output between its output and the pulse (*a*).

In order to obtain the signal (*d*), a flip-flop circuit may be provided which provides a 1 in response to the fall of the signal (*c*) and which is reset by the next pulse (*a*).

Further, there are provided a synchronizing signal (*f*) and a synchronizing signal (*g*) the former of which is lagging and the latter of which is leading in phase with respect to the synchronizing signal (*a*). The on-off control of the switching circuit 29 in FIG. 4 is effected by the signals (*c*), (*d*), and (*e*). The switching circuit 29 consists of three gates, and the signals (*c*), (*d*) and (*e*) are utilized as signals for opening and closing the gates. As signals for the transfer initiation, the AND outputs between the signal (*f*) and the signals (*c*), (*d*), (*e*) can be utilized.

On the other hand, the signal (*f*) is used in order to previously reset the contents of the coincidence value hold circuit 12 in FIG. 4 at the value of the low degree of coincidence. More specifically, the much discoincident information is previously supplied at the beginning of each frame, to make preparations for the detection of a coincident point in the particular frame. The signal (*g*) can be used as " write " pulses which have the AND logic taken with the signals (*c*), (*d*) and (*e*) at the ends of the respective frames, to transfer information via switching circuits 15 and 16 to any one of coincidence value memories 17, 18 and 19 and any one of coordinate memories 20, 21 and 22. The control of the switching circuits 15 and 16 can be effected similarly to the control of the switching circuit 29.

In this way, the most probable positions for the three partial standard patterns are detected by the scanning of the three frames, and the coordinate positions at that time are held in the registers 20, 21 and 22.

At this time, the coincidence value information for the respective partial patterns are stored in the registers 17, 18 and 19, and the results are compared by a judging circuit 23. This circuit is a detector of, for example, the maximum value and the second maximum value. It selects the two values in the order of the high degree of coincidence, and opens and closes a selection circuit 24 according to the results.

Accordingly, the outputs from the selection circuit 24 are two of the coordinates in the memories 20, 21 and 22, that is, the coordinates of the representative positions of the two partial patterns of the highest degrees of coincidence. Regarding the pattern in FIG. 1, the coordinates of, for example, the points A and B are supplied.

A computing circuit 25 computes the coordinates of the final positions $P_1$ and $P_2$ from the combinations among the adder, subtractor, multiplier and divider circuits on the basis of the coordinates of the two points, and supplies the computer results at its output. In this case, since the coordinates of the representative positions of the two partial patterns, being more probable according to the degree of coincidence, are evaluated, the foregoing processing in which the respective representative positions are evaluated for some combinations of the patterns can be omitted.

It has been described above that the coordinate values of the three partial patterns are obtained from the images of the three successive frames, whereupon the coordinates are obtained by means of the judging circuit 23, the selection circuit 24 and the computing circuit 25.

However, a variety of modifications are possible. For example, when the coordinates of the representative positions of the pattern A and the pattern B are respectively obtained during the first frame and the second frame, a judgement is immediately made with the coordinates of the two positions. If the result does not pass the examination, the information on the pattern A remains, and information on the pattern C is subsequently supplied during the next frame. Alternatively, information on both the patterns A and B is discarded, and the judgement is effected on a new set of patterns C and D. In such a case, a judging circuit 23 relying on the degree of coincidence becomes unnecessary, and only the control of the supplying of information becomes somewhat complicated.

The processing in the processor 30 as explained above is effected at very high speed by constructing special-purpose hardware. However, even when a minicomputer being a conventional general-purpose hardware is used, all the judging process steps can be carried out in a very short period of time at the end of the frame, namely during the flyback period of the image pickup device.

In either case, when the partial pattern in a certain frame is set out, the calculation for obtaining the representative position of the partial pattern and the calculation for obtaining the desired points $P_1$ and $P_2$ on the basis of the representative position can be processed in real time. In a great many cases, accordingly, the final coordinate positions are evaluated by the calculated result at the time at which the pattern A and the pattern B, for example, have been received. In actuality, it is common that, unless the object is quite dirty locally, the necessity for successively setting out new local patterns from the pictures of the third, fourth, . . . . . frames and for detecting the positions by the use of them does not arise.

In the above, description has been made of an example in which only one coincidence detector 9 is employed. In this case, the position of one partial pattern is detected during one frame, in principle. If the locations of partial patterns are limited to specific parts of the field of view and rough search areas are known, then it is possible to switch the contents of the partial pattern memory 8 in such manner that when the upper half of the picture frame is being scanned, the pattern A is held therein, while when the lower half is being scanned, the pattern B is held therein.

Further, it is natural there if three sets each consisting of a coincidence detector 9, a comparator 10, a gate circuit 11, a coincidence value hold circuit 12, a gate circuit 13 and a coordinate value register 14 are provided, the positions for the three patterns A, B and C can be simultaneously obtained during an identical frame by means of the three coincidence detectors 9.

In this case, the three coincidence value hold circuits 12 and the three coordinate value registers 14 correspond, respectively to the coincidence value memories 17, 18 19 and to the coordinate memories 20, 21, 22 and, hence, the switching circuits 15 and 16 become unnecessary.

Figure 6:
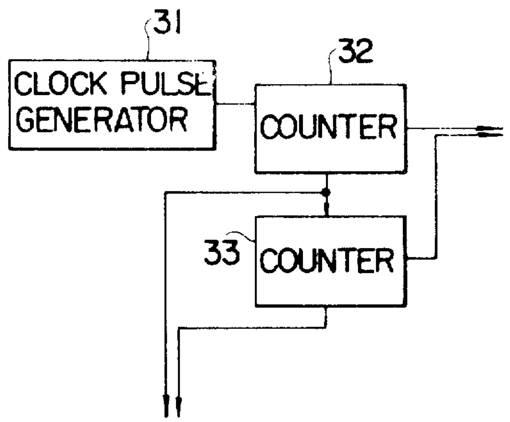
FIG. 6 is a diagram showing a specific example of a synchronous signal and coordinate signal generator circuit in the apparatus of FIG. 4.
Figure 7:
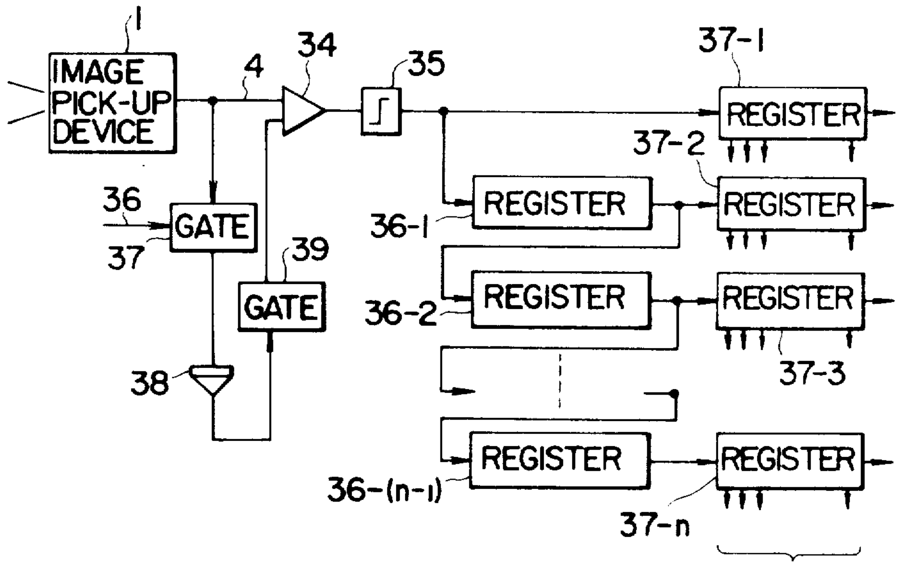
FIG. 7 is a schematic diagram showing a specific example of an image input circuit in the apparatus in FIG. 4.
Figure 8:
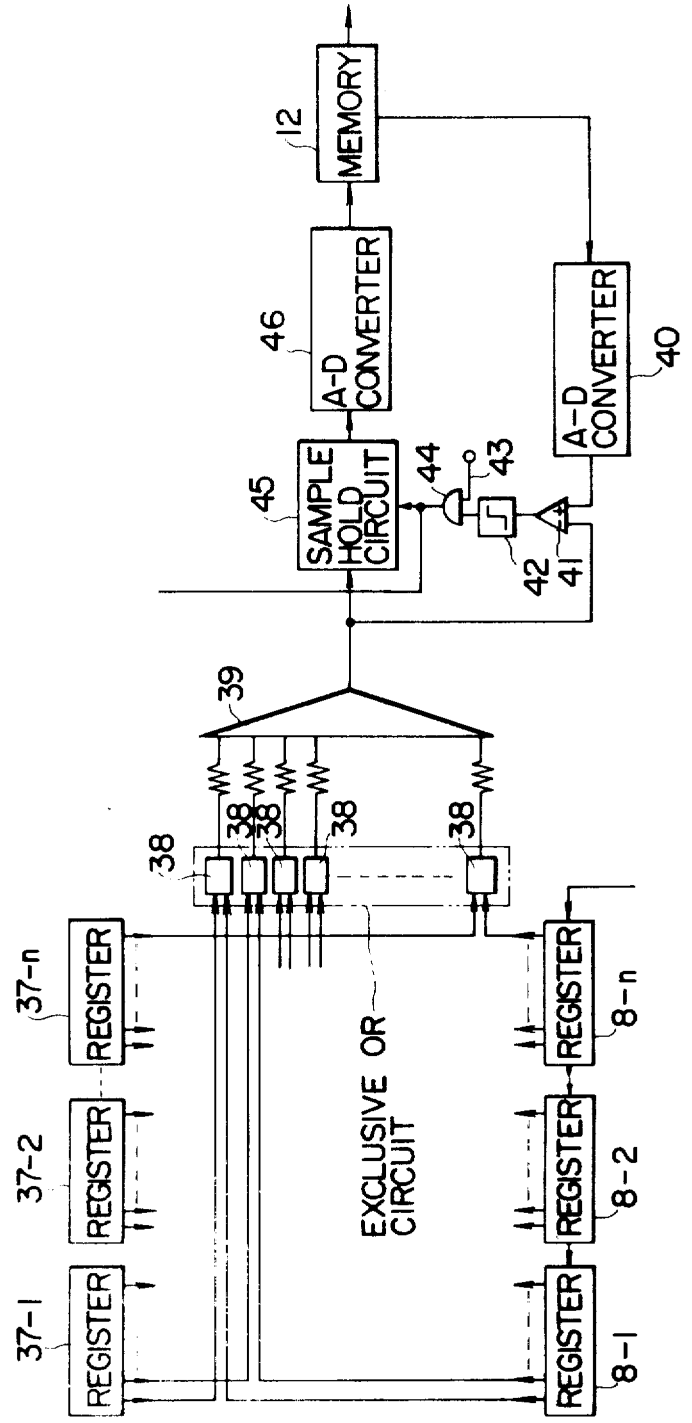
FIG. 8 is a schematic diagram showing a specific example of a coincidence detection circuit in the apparatus of FIG. 4.

FIGS. 6 to 8 show examples of further configurations of the principal parts of the over-all construction of the present invention illustrated in FIG. 4.

FIG. 6 shows examples of the synchronous signal generator 2 and the coordinate generator 3 in FIG. 4. The circuit arrangement is such that pulses having a frequency of, for example, approximately 6 MHz from a clock pulse generator 31 are counted by a counter (termed the X-counter) 32, and that when the contents of the counter 32 reach a prescribed value, the clock resets itself and, simultaneously, adds 1 (one) to a counter (termed the Y-counter) 33. The counter 33 is so constructed as to reset itself and also reset the X-counter 32 when a certain fixed value is reached.

Thus, the output pulses of the respective counters become X-synchronizing and Y-synchronizing signals, and the voltage values of pulses are appropriately transformed with reference to the synchronizing signals, to drive the impage pickup device employing the Vidicon or the like.

On the other hand, the contents themselves of the X-counter and Y-counter become information as to the position of the beam, and give coordinate values of the scanning.

FIG. 7 shows an example of the image input system in FIG. 4. The video information 4 from the image pickup device 1 is supplied to a threshold circuit 35 through a differential amplifier 34.

In this case, a signal 36 which is a 1 only when a certain picture frame part, for example, when the central part is being scanned, is separately prepared. The image signal 4 is fed through a gate circuit 37 to an integrator at that time only, and the output of the integrator is sample-held by a hold circuit 39 at the end of a frame.

The output of the hold circuit 39 is supplied through an appropriate attenuator to the differential amplifier 34 as may be needed.

The function of the circuits 37, 38, 39 and 34 is to continually evaluate a threshold value which corresponds to the mean brightness of the specific picture frame part of the immediately preceding frame. Using these circuits and the thresholding circuit 35, intermediate values between the bright and dark levels can be successfully transformed into binary values. The abovementioned circuits correspond to the pre-processor 5 in FIG. 4.

As scanning proceeds, the image information transformed into binary values is sequentially supplied to a shift register 37-1 and also to (n - 1) shift registers 36-1, 36-2, . . . and 36-(n-1). It is sequentially supplied from these respective shift registers 36-1, 36-2, . . . and 36-(n-1) to shift registers 37-2, 37-3, . . . and 37-n. The shift registers 36-1, . . . have a number of bit stages corresponding to the number of picture elements of one horizontal scan, and the number *n* is 12 ( twelve ) for the 12 × 12 partial patterns of the foregoing case. In one design example, accordingly, the number of the shift registers 36-1, . . . is eleven, the number of the shift registers 37-1, . . . is twelve, and the number of bit stages of the shift registers 37-1, . . . is twelve.

Thus, information at the immediately preceding raster is supplied from the shift register 36-1, information at the second preceding raster is supplied from the shift register 36-2, and so forth. Consequently, information totalling twelve in the horizontal direction in each of twelve rasters, that is, 12 × 12 plane information appears in the shift registers 37-1, 37-2, . . . and 37-n in succession with the proceeding of the scanning. Accordingly, the contents of the 12 × 12 picture elements may be supplied to the coincidence detector 9.

FIG. 8 shows an example of the portion of the system for detecting the degree of coincidence. Here the plane partial pattern memory 8 is represented as a plurality of registers 8-1, 8-2, . . . and 8-n, which are respectively disposed opposite the shift registers 37-1, 37-2, . . . and 37-n, respectively.

Using "EXCLUSIVE OR" logic circuits 38, only when no coincidence is established for the bits, logical 1 outputs are provided.

The outputs are summed by an adder 39. Then, the output of the adder is larger when the pattern is less coincident, whereas it is a smaller output, closer to zero, when the pattern is more coincident.

Accordingly, if the output of the adder 39 is supplied to a differential amplifier 41 together with analog information into which the contents digitally stored in the coincidence value hold circuit 12 are converted by a digital-to-analog converter 40, then the output of a thresholding circuit 42 becomes 1 only when the degree of coincidence is increased. The degree of coincidence at that time is stored in a sample-hold circuit 45 through a gate 44 in response to a timing pulse 43 synchronized with the clock pulse. After being converted into digital form by an analog-to-digital converter 46, the degree of coincidence is stored in the coincidence value hold circuit 12, so that the coincidence value in it is renewed.

On the other hand, the output from the gate 44 opens the gate circuit 13 as already illustrated in FIG. 4, and stores the coordinate position at that time in the coordinate value register 14.

In the foregoing example, the image values are assumed to be transformed into binary values. This is advantageous for objects, such as a transistor, having patterns whose brightness and darkness are comparatively clear. The transformation into binary values, however, is not necessarily essential. It is also possible to calculate the image values as multi-valved information. In this case, the shift registers 36-1, . . . and 37-1, . . . in FIG. 7 must be multi-value shift registers which have prescribed levels. Each logical circuit 38 in FIG. 8 for the coincidence value detection can be so arranged, by way of example, that a subtractor circuit and a circuit to obtain absolute values are connected in series. Thus, the differences of the pattern at the respective bits are added by the adder 39.

The adder may be arranged so that a current is permitted to flow through a certain resistance from a constant-current source, and the current may be controlled in proportion to the respective differences.

In the above example, description has been made of the case where the partial patterns locally present in the complicated pattern of the object itself are employed as standards. However, this is not necessarily essential, but specified patterns can sometimes be disposed on the object for the purpose of the detection.

Figure 9:
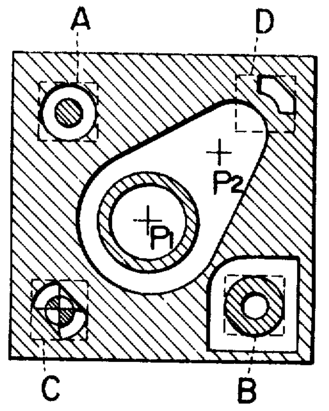
FIG. 9 is a schematic diagram for explaining partial patterns.

FIG. 9 shows examples of such marks. On the surface of a transistor, detecting marks are provided simultaneously with electrodes by aluminum vapor deposition and photoetching. Here, the cross-hatched parts are silicon oxide portions, while those parts with no cross-hatching are evaporated aluminum portions. Square broken-line frames are depicted on the marks in order to indicate the sizes of the local patterns to be memorized as standards.

Since the patterns A and B are concentric shapes, they are suited for inclinations of the transistor within the XY-plane. They are advantageous in that the slant patterns as shown in FIGS. **3*d* to 3*i* need not be separately provided. Also, in this example, the patterns A and B are of equal size and opposite in the locations of bright and dark parts. With such a measure, the logical circuits 38 and the adder circuit 39 in FIG. 8** may be constructed in common, and two circuits of a circuit for detecting the degree of coincidence with the maximum value and a circuit for detecting the minimum value may be provided as the succeeding circuits.

Accordingly, in this case, the positions of the patterns A and B can be obtained in parallel at an identical frame by merely changing the circuit part.

The pattern C in FIG. 9 is a more complicated example. If the shape is suitably coded, it is possible to detect the position only when a certain specific code pattern is entered. That is, this system can also be used for the selection of a particular type of article.

Further, the pattern C is an example in which a part of the inherent pattern of the object and a part expressly provided are combined into one local pattern. In this manner, the local patterns can have intentional various constructions. The detecting system of this system can be effected by the mere operation of storing standard patterns for all the local patterns.

A disadvantage of this system is that when it is used in a place where the fluctuations of the ambient temperature are intense, image signals have the possibility of shifting. More specifically, even when the center of an optical system is adjusted at the beginning so as to agree with the center of the picture frame, an image pickup device employing a Vidicon involves the possibility that the drift of the center of the beam or the variation of the swinging width of the beam will shift the image center and the optical center or make different the magnifying ratios of the image and the object. When the image pickup device is a solid state device such as photoelectric element array, only the temperature drift of the optical system arises, which causes no substantive problem in usual uses.

Figure 10:
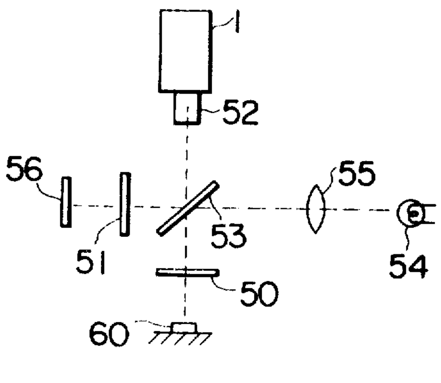
FIG. 10 is an arrangement of an image pickup device and its attachments for use in the present invention.

FIG. 10 illustrates a compensating method for such a drift where a Vidicon image pickup device or the like is employed.

To take, as an example, a case where the present invention is applied to an automatic assembling machine for transistors, it is convenient to carry out the drift compensation at intervals of approximately one hour. In this case, the processor 30 closes a shutter 50 and opens a shutter 51 in the device of FIG. 10 when a certain fixed time known from a timer possessed by itself or when the request is made by an operator or from the automatic assembling machine.

Normally, the state is the opposite, and the image pickup device 1 is viewing an object 60 through an optical system, composed of lenses, etc., 52 and a half-mirror 53, the object being illuminated by a light source 54 and a lens 55. At the time of correction, the light from the light source 54 falls on a reference plate 56 with its optical axis carefully set, through the opened shutter 51, and the image pickup device 1 views the reference plate 56 through the half-mirror 53. On the reference plate, there are depicted, for example, five different binary bright-and-dark patterns of one at the central part and every one at each of the four corners. At this time, it is possible that the image signals from the image pickup device 1 detect the positions of the local patterns in succession over some frames by means of the foregoing circuitry, and that the results are reported to the processor 30, for example, a minicomputer. On the basis of the positional information, the processor 30 knows, for example, the amount of shift of the image from the central pattern and a variation of the magnification of the image from the average of the four corner patterns. Thus, parameters employed in the computing circuit in FIG. 4 can be corrected.

In this way, periodical corrections can be automatically effected.

Figure 11:
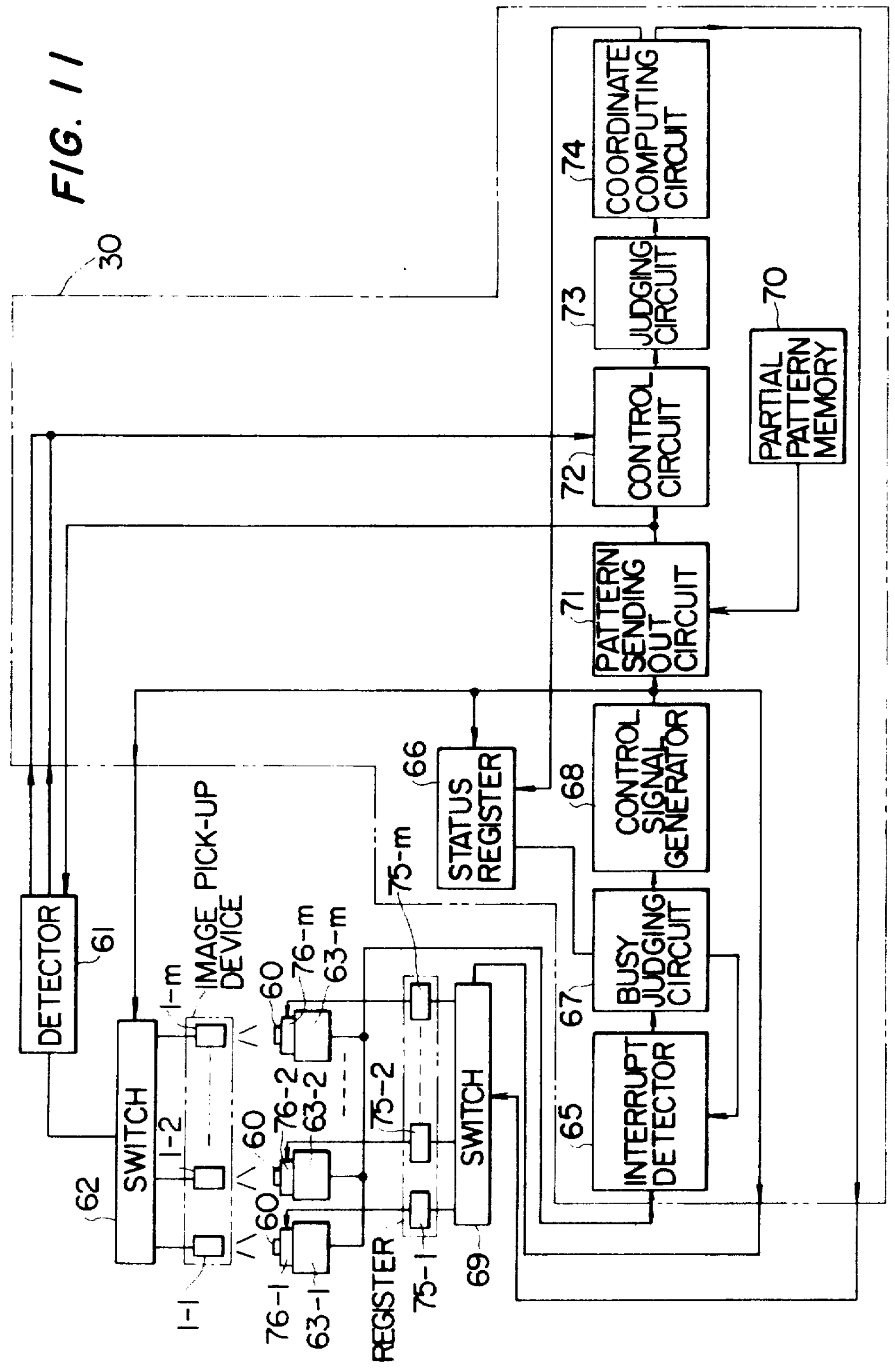
FIG. 11 is a schematic diagram of a system in which the present invention is applied to the production of transistors.

FIG. 11 is a diagram of the overall construction in the case where the system of the present invention is applied to the production of transistors.

The parts of FIG. 4 other than the processor 30 are shown as a detector 61.

To the detector 61, a plurality of image pickup devices 1-1, 1-2, . . . and **1-*m* are coupled by, for example, an electronic switch 62**. The respective image pickup devices belong to *m* automatic bonding machines 63-1, 63-2, . . . and **63-*m*, and are adapted to view the transistors 60** supplied to the corresponding machines.

When the machine is adapted to generate a signal indicating that the transistor object has been supplied to the machine, a signal is fed via a bus line 64 and becomes an interrupt signal to the processor 30. The signal is detected by an interrupt source detection circuit 65. Thereafter, the contents of a status register 66 indicate which of the automatic bonding machines 63-1, . . . and 63-m the detector 61 is being served and are judged by means of a busy judging circuit 67. If the detector 61 is serving for any of the machines, a busy signal is provided to return the command to the interrupt source detection circuit 65. This procedure is repeated until the busy signal is released. If the detector 61 is not busy, it is usable. Then, a control signal is supplied to the interrupting machine by a control signal generator 68 at the next stage, to change over the switch 62 and a switch 69 to the corresponding machine. Simultaneously therewith, that bit position of the status register 66 which corresponds to the interrupting machine is turned "on," to indicate that the detector 61 has become busy and to mask a subsequent interruption. In this case, it is common that a register is contained in the interrupt source detection circuit so as to hold only the interrupt signal.

At the next step, a standard partial pattern is transmitted from a partial pattern memory 70 (equivalent to the combination of the circuits 26, 27, and 28 in FIG. 4) to the detector 61 by a standard pattern send-out circuit 71. A coordinate signal and a coincidence value signal thereby obtained are received by a data input and control circuit 72. Thereafter, the computation explained above is carrried out by the use of these data. The final result is supplied by means of a judging circuit 73 and a coordinate computing circuit 74.

The final coordinate position is supplied to the corresponding one of *m* registers 75-1, 75-2, . . . and 75-m in accordance with the selected state of the switch 69. On the basis of the values the corresponding one of XY-servomechanism 76 is driven.

The servomechanism 76 is depicted in the figure as moving the object 60. In the transistor assembling machine, however, it is more preferable that the object is held at rest, that a gold-wire bonder based on the thermocompression method is located by the servomechanism, and that a series of steps of the thermocompression bonding process are thereafter effected by predetermined cam operations.

In the foregoing description, the transistor is the object. However, this is for the purposes of illustration only, and it is a matter of course that the object may be anything insofar as it is suited to this system. For detecting the position of an object, usually it leads to a large amount of information and it is next to impossible to store the entire object as one pattern; even if storage is possible, the apparatus will become very bulky.

The apparatus of the present invention has a feature in detecting the positions by storing only the partial patterns which are comparatively small. This achieves effective applications with a comparatively small scale of apparatus.

In the foregoing description, the partial patterns are square or rectangular.

If, in the partial pattern consisting of picture elements which amount to, example, 144 of 12 × 12, values in the vicinities of the four corners of the square region are disregarded, and, for example, the logical circuits 38 in FIG. 8 are omitted or their outputs are inhibited though they are not omitted, then this is equivalent to the use of a circular partial pattern.

Although an error attributable to digitization of a plane arises, the partial pattern of any desired shape can be processed.

As stated above, the present invention makes a pattern matching at the same speed as the scanning speed of the image pickup device possible with a comparatively small scale of apparatus. In addition, since the patterns are restricted to the partial patterns, the capacity of the storage may be small.

Accordingly, when the present invention is applied, the recognition of the positions of an object which has hitherto been next to impossible, becomes possible with a visual device. Moreover, since it can be realized economically, the automation of production machines and the like are facilitated.

While we have shown and described several embodiments in accordance with the present invention, it is understood that the same is not limited thereto but is susceptible of numerous changes and modifications as known to a person skilled in the art, and we therefore do not wish to be limited to the dtails shown and described herein but intend to cover all such changes and modifications as are obvious to one of ordinary skill in the art.

What is claimed is:

1. A system for detecting the position of a pattern comprising:

image pickup means for sequentially scanning an image of an object to produce first signals representative thereof;

memory means for storing signals representative of a two-dimensional standard pattern which corresponds to a selected portion of a two-dimensional pattern of the object;

first means, responsive to said first signals, for generating second signals representative of sequential portions of a two-dimensional pattern of said object as sequentially scanned by said image pickup means;

second means, responsive to the scan of said object by said image pickup means, for generating third signals representative of the respective sequential positions of said sequentially scanned two-dimensional pattern portions;

third means, coupled to said memory means and said first means, for comparing the signals stored in said memory means with said second signals, to thereby detect which of said sequentially scanned two-dimensional pattern portions has the greates degree of coincidence with said standard pattern; and fourth means, coupled to said second and third means for calculating the coordinates of a specific position within the two-dimensional pattern of said object on the basis of the coordinates of the position of that pattern portion having the greatest degree of coincidence with said standard pattern.

2. A system according to claim 1, further including means, coupled between said image pickup means and said first means, for converting images received by said image pickup means into binary signals, whereby said third means compares each bit making up the signals stored in said first memory and said binary signals, to detect the degree of coincidence therebetween.

3. A system according to claim 2, wherein said binary signal converting means includes means for storing signals representative of a two-dimensional pattern of that frame immediately preceding the frame which is being scanned by said image pickup means, means for generating a signal representative of the average brightness of the two-dimensional pattern of the preceding frame, and means for converting image information of the frame being scanned into binary signals in dependence upon a threshold value corresponding to said average brigtness signal.

4. A system according to claim 3, wherein said means for connecting image information comprises a threshold circuit and a plurality of sequentially arranged shift registers connected thereto for generating and storing binary signals respectively corresponding to picture elements for a respective plurality of sequential horizontal scans.

5. A system according to claim 1, wherein said memory means contains a plurality of memory storage locations for storing therein at least two specific patterns within said two-dimensional pattern of said object as respective standard patterns, and wherein said third means comprises means to detect which sequentially scanned pattern portion has the greates degree of coincidence with one of said stored standard patterns, and means to detect which sequentially scanned pattern portion has the greatest degree of coincidence with another of said stored standard patterns, so that the coordinates of a specific position within said two-dimensional pattern are calculated on the basis of the coordinates of positions representing both sequentially scanned pattern portions.

6. A system according to claim 5, wherein said fourth means includes means for comparing the degrees of coincidence between the pattern portions having the highest degrees of coincidence and for detecting the coordinates of a representative position of that pattern portion which has the maximum degree of coincidence, so that the coordinates of said specific position within said two-dimensional pattern are calculated on the basis of the detected coordinates of said representative position.

7. A system according to claim 5, further comprising respective switching means, coupled to said memory means and said third means, for commutating the respective comparisons between said standard patterns and said sequentially scanned pattern portions for the respective sequential scanning periods or scanning areas of said object by said image pickup means.

8. A system according to claim 5, wherein said fourth means includes means for effecting an angular correction for said two-dimensional pattern in accordance with the coordinate of the representative positions of a scanned pattern portion having a high degree of coincidence.

9. A system according to claim 1, further comprising object marking means including a half-mirror and a first shutter disposed between said image pickup means and said object, a light source for illuminating said object through said half-mirror and said first shutter, a reference plate having a prescribed mark formed thereon on which light from said light source impinges through said half-mirror, and a second shutter disposed between said half-mirror and said reference plate, so that the pattern of said object and the prescribed mark on said reference plate can be selectively received by said image pickup means.

10. A system according to claim 1, wherein said object is a semiconductor element.

11. A system according to claim 1, wherein said object has a concentrically shaped pattern formed thereon for selective detection thereof.

12. A system according to claim 1, wherein said image pickup means includes a plurality of image pickup devices and means coupled between said image pickup devices and said first means for selectively switching the first signals provided by said pickup devices to said first means.

13. A system according to claim 4, wherein said third means comprises a plurality of "EXCLUSIVE OR" logic circuits coupled to the respective bit positions of said shift registers and to the memory bit positions of said first memory means, for respectively determining bit-coincidence between the respective bit positions being compared, a summing circuit for providing an output signal representative of the sum of the outputs of said "EXCLUSIVE OR" circuits and means for comparing the output of said summing circuit with a signal representative of the degree of coincidence of a previously scanned pattern portion with a standard pattern, and for generating an output signal only when said degree of coincidence representative signal exceeds a threshold value.

14. A system according to claim 13, further including means coupled between said second means and said fourth means, and responsive to the output signal generated by the comparing means of said third means, for gating said third signals to said fourth means.

15. In a system for assembling a plurality of articles, especially semiconductor elements, including automatic machines for effecting selective bonding of the articles, an improved sub-system for detecting the position of a pattern correponding to a respective one of said articles to be assembled, said improved sub-system comprising:

a plurality of image pickup devices each of which is disposed to sequentially scan an image of an article to produce first signals representative of a pattern defined by said article;

memory means for storing signals respresentative of a two-dimensional standard pattern which corresponds to a selected portion of a two-dimensional pattern of the object;

first means, responsive to said first signals, for generating second signals representative of sequential portions of a two-dimensional pattern of said article as sequentially scanned by said image pickup device;

second means, responsive to the scan of said article by said image pickup device, for generating third signals representative of the respective sequential positions of said sequentially scanned two-dimensional pattern portions;

third means, coupled to said memory means and said first means, for comparing the signals stored in said memory means with said second signals, to thereby detect which of said sequentially scanned two-dimensional pattern portions has the greates degree of coincidence with said standard pattern;

fourth means, coupled to said second and third means, for calculating the coordinates of a specific position within the two-dimensional pattern of said article on the basis of the coordinates of the position of that pattern portion having the greatest degree of coincidence with said standard pattern;

fifth means, coupled between each image pickup device and said first means, for selectively switching the outputs of the respective ones of said image pickup devices to said first means, for selective coordinate position calculation of each respective article; and sixth means, coupled between said fourth means and said automatic bonding machines, for positioning the respective ones of said bonding machines relative to the respective ones of said articles in accordance with the coordinate calculation outputs of said fourth means.

* * * * *